US011365458B2

(12) United States Patent
Sugiyama et al.

(10) Patent No.: US 11,365,458 B2
(45) Date of Patent: Jun. 21, 2022

(54) POST-HEATING TREATMENT DEVICE AND POST-HEATING TREATMENT METHOD

(71) Applicant: DAI-ICHI HIGH FREQUENCY CO., LTD., Tokyo (JP)

(72) Inventors: Kenji Sugiyama, Tokyo (JP); Nobuhiko Matsumoto, Tokyo (JP); Ryuta Harada, Tokyo (JP); Kenji Saita, Tokyo (JP); Takeshi Yamamoto, Tokyo (JP)

(73) Assignee: DAI-ICHI HIGH FREQUENCY CO., LTD., Tokyo (JP)

( * ) Notice: Subject to any disclaimer, the term of this patent is extended or adjusted under 35 U.S.C. 154(b) by 422 days.

(21) Appl. No.: 16/318,040

(22) PCT Filed: Jun. 13, 2017

(86) PCT No.: PCT/JP2017/021740
§ 371 (c)(1),
(2) Date: Jan. 15, 2019

(87) PCT Pub. No.: WO2018/020872
PCT Pub. Date: Feb. 1, 2018

(65) Prior Publication Data
US 2019/0233909 A1 Aug. 1, 2019

(30) Foreign Application Priority Data

Jul. 27, 2016 (JP) .............................. JP2016-147354

(51) Int. Cl.
*C21D 1/42* (2006.01)
*C21D 11/00* (2006.01)
(Continued)

(52) U.S. Cl.
CPC .............. *C21D 1/42* (2013.01); *B23K 31/125* (2013.01); *C21D 1/26* (2013.01); *C21D 9/04* (2013.01);
(Continued)

(58) Field of Classification Search
CPC .. B23K 2101/26; B23K 31/125; C21D 11/00; C21D 1/26; C21D 1/42; C21D 9/04;
(Continued)

(56) References Cited

U.S. PATENT DOCUMENTS 4,827,099 A    5/1989  Krebs et al.
5,597,498 A *  1/1997  Sunayama ........... B23K 9/1274
                                                         219/124.34
(Continued)

FOREIGN PATENT DOCUMENTS

BR    PI0916714-5 A2    2/2010
JP    S52-25687 A       2/1977
(Continued)

OTHER PUBLICATIONS

Brazil Patent Office, "Office Action for Brazillian Patent Application No. 112019001382-2," dated Jul. 28, 2020.
(Continued)

*Primary Examiner* — Jessee R Roe
*Assistant Examiner* — Michael Aboagye
(74) *Attorney, Agent, or Firm* — Manabu Kanesaka

(57) ABSTRACT

A post-heating treatment device includes a detecting device for a height variation of a surface of the rail at every, predetermined pitch along a length direction of the rail, a control unit for defining a position of the rail to be a starting point of the welded section when the height variation detected by the detecting device at every predetermined pitch exceeds a predetermined threshold for the number of a predetermined times consecutively and defining a position (Continued)

of the rail to be an end point of the welded section when the height variation detected by the detecting device at every predetermined pitch is below the predetermined threshold for the number of the predetermined times consecutively, and a heating unit for heat treatment based on a position of the welded section detected by the detecting device. A post-heating treatment method using the post-heating treatment device is provided.

5 Claims, 9 Drawing Sheets

(51) Int. Cl.
      *C21D 9/04*           (2006.01)
      *C21D 9/50*           (2006.01)
      *G01B 11/00*         (2006.01)
      *B23K 31/12*         (2006.01)
      *C21D 1/26*           (2006.01)
      *G01B 11/06*         (2006.01)
      *H05B 1/02*           (2006.01)
      *F27D 21/00*         (2006.01)
      *B23K 101/26*        (2006.01)
      *B23K 103/04*        (2006.01)
      *B23K 31/02*         (2006.01)
(52) U.S. Cl.
      CPC ............... *C21D 9/50* (2013.01); *C21D 11/00* (2013.01); *F27D 21/00* (2013.01); *G01B 11/00* (2013.01); *G01B 11/0608* (2013.01); *H05B 1/02* (2013.01); *H05B 1/023* (2013.01); *B23K 31/02* (2013.01); *B23K 2101/26* (2018.08); *B23K 2103/04* (2018.08); *Y02P 10/25* (2015.11)
(58) Field of Classification Search
      CPC ........... C21D 9/50; F27D 21/00; G01B 11/00; G01B 11/0608; H05B 1/02; H05B 1/023

USPC .......... 432/45; 219/53, 54, 125.1, 137 R, 55, 219/101, 121.28, 121.29, 121.31, 121.32, 219/121.3
See application file for complete search history.

(56) References Cited

U.S. PATENT DOCUMENTS

| | | | | |
|---|---|---|---|---|
| 5,650,852 | A * | 7/1997 | Chastain | G01B 11/005 33/702 |
| 6,299,050 | B1 * | 10/2001 | Okamura | B23K 20/123 156/73.5 |
| 8,776,564 | B2 | 7/2014 | Shimanuki et al. | |
| 9,334,546 | B2 * | 5/2016 | Kristan | C21D 1/62 |
| 9,375,808 | B2 * | 6/2016 | Fikes | B23K 9/0956 |
| 2015/0211087 | A1 | 7/2015 | Karimine et al. | |

FOREIGN PATENT DOCUMENTS

| | | | |
|---|---|---|---|
| JP | H04-371523 | A | 12/1992 |
| JP | H11-304985 | A | 11/1999 |
| JP | 2001-105158 | A | 4/2001 |
| JP | 5477453 | B1 | 4/2014 |
| JP | 2014-101533 | A | 6/2014 |
| JP | 2014-101534 | A | 6/2014 |
| JP | 2014101534 | A * | 6/2014 |
| RU | 59058 | U1 | 12/2006 |
| RU | 2589533 | C2 | 7/2016 |
| SU | 1718714 | A3 | 3/1992 |

OTHER PUBLICATIONS

PCT/ISA/210, "International Search Report for International Application No. PCT/JP2017/021740," dated Aug. 1, 2017.
Russia Patent Office, "Office Action for Russian Patent Application No. 2019103241/05(005919)," dated Jul. 2, 2020.

* cited by examiner

POST-HEATING TREATMENT DEVICE AND POST-HEATING TREATMENT METHOD

RELATED APPLICATIONS

The present application is National Phase of International Application No. PCT/JP2017/021740 filed Jun. 13, 2017, and claims priority from Japanese Application No. 2016-147354, filed Jul. 27, 2016, the disclosure of which is hereby incorporated by reference herein in its entirety.

TECHNICAL FIELD

The present invention relates to a post-heating treatment device and a post-heating treatment method, and more particularly, to a post-heating treatment device and a post-heating treatment method for automatically detecting a welded section of a rail jointed by welding, and removing the residual stress of the welded section by reheating.

BACKGROUND ART

Techniques for providing long rails by welding rail ends are widely employed for reduction of generation of noises, vibration, or for reduction of maintenance cost.

As illustrated in FIG. 10, the rail ends of at least two rails R1 and R2 are welded to provide a rail R having a welded section W. As shown in FIG. 10, the rail R has a head r1 to be brought into contact with a wheel, a foot r2 in contact with a sleeper, and a web r3 connecting the head r1 and the foot r2.

In the welded section W, fatigue cracks may be formed in the web r3 of the rail or starting from the web r3 in the horizontal direction, because of repeated passage of a vehicle such as a freight-train car that is heavily loaded. This fatigue crack is affected by the strong tensile residual stress in the vertical direction (circumferential direction), generated in the web r3 at the welded section W. This tensile residual stress is generated by a temperature gradient between the welded section W and the vicinity thereof in welding.

In order to reduce such residual stress, Patent Literature 1 discloses a post-heating treatment device disposed away from the welded center of a rail at a predetermined distance (20 mm or more and 300 mm or less) in a length direction, and provided with an induction heating coil which heats the entire circumference of the rail.

This device can effectively reduce the residual stress existing in the welded section by heating at a high temperature rise rate with the use of an electromagnetic induction coil.

In addition, the induction heating coil heats the entire circumference of the rail, thus making it possible to reduce an increase in residual stress in the length direction of the rail.

CITATION LIST

Patent Literature

Patent Literature 1: Japanese Patent No. 5477453

SUMMARY OF INVENTION

Technical Problem

Now, in the case of applying a post-heating treatment to the welded section of the rail with the method disclosed in Patent Literature 1, the heating operation is conventionally performed after a worker has checked the welded section W visually and placed an induction heating coils at a predetermined position with reference to the center of the welded section.

However, when the work of checking of the welded section of the rail is done by human operation as mentioned above, there arises a problem where the disposition of coils are also likely to be deviated from an appropriate position unless done by an experienced worker, or the quality of welding after the post-heating treatment is not always stable.

More specifically, to efficiently obtain a rail of stable quality after the post-heating treatment, it is desirable to automatically detect the welded section of the rail, automatically dispose an induction heating coil at a predetermined position with the center of the welded section as a reference, and perform the heat treatment.

However, any method for automatically detecting the welded section and performing a post-heating treatment is not disclosed as for the device disclosed in Patent Literature 1.

The present invention has been made with attention focused on the foregoing points. An object of the present invention is to provide a post-heating treatment device with which a welded section of a rail is automatically detected and heat treatment can be performed at an appropriate position of the rail, and to provide a method for post-heat treatment.

Solution to Problem

The post-heating treatment device according to the present invention is a device that performs a post-heating treatment for a welded rail, the post-heating treatment device includes detecting means for height variation on the head surface of the rail at every predetermined pitch along the rail direction, a control unit for defining a position of the rail to be a starting point of a welded section when the height variation detected by the detecting means at every predetermined pitch exceeds a predetermined threshold for the number of a predetermined times consecutively and defining a position of the rail to be an end point of the welded section when the height variation detected by the detecting means at every predetermined pitch is below the predetermined threshold for the number of the predetermined times consecutively, and heating means for performing the heat treatment on the basis of the position of welded section defined by the control unit.

The detecting means preferably detects the height variation by receiving reflected light from the rail top surface that is irradiated with laser light.

With this configuration, for a welded section of a continuous welded rail by welding, a starting point of a welded section is defined when the height variation detected by the detecting means at every predetermined pitch exceeds a predetermined threshold for the number of a predetermined times consecutively, and a position of the rail to be an end point of the welded section is defined when the height variation detected by the detecting means at every predetermined pitch is below the predetermined for threshold the number of the predetermined times successively. This enables to detect the center of the welded section automatically, and determine an appropriate position for disposing an induction coil. In addition, a rail of stable quality after post-heating is available because detection of an appropriate position for the welded section and post-heating treatment of the welded section are automatically performed. Further, defining a position of the rail to be a starting point of a welded section when the height variation detected by the detecting means at every predetermined pitch exceeds a predetermined threshold for the number of a predetermined times consecutively can prevent false detection of narrow foreign matters, such as a spatter. Height variation detection using laser light can detect the welded section even for welded section with a low-height projection.

In addition, the post-heating treatment method according to the present invention is a method that performs a post-heating treatment for a welded rail, the post-heating treatment method including a step for detecting height variation on the head surface of the rail at every predetermined pitch along the rail direction, a step for defining a position of the rail as a starting point of a welded section when the height variation detected by the detecting means at every predetermined pitch exceeds a predetermined threshold for the number of a predetermined times consecutively and defining a position of the rail as an end point of the welded section when the height variation detected by the detecting means at every predetermined pitch is below the predetermined threshold for the number of the predetermined times consecutively, and a heating step for performing the heat treatment on the basis of the position of welded section defined by the control unit.

The detecting step where the height variation is preferably detected by receiving reflected light from the rail head surface that is irradiated with laser light.

With this method, for a welded section of a continuous welded rail by welding, a starting point of a welded section is defined when the height variation detected by the detecting means at every predetermined pitch exceeds a predetermined threshold for the number of a predetermined times consecutively, and defining a position of the rail to be an end point of the welded section when the height variation detected by the detecting means at every predetermined pitch is below the predetermined for threshold the number of the predetermined times successively. This enables to detect the center of the welded section automatically, and determine an appropriate position for disposing an induction coil. In addition, a rail of stable quality after post-heating is available because detection of an appropriate position for the welded section and post-heating treatment of the welded section are automatically performed. Further, defining a position of the rail to be a starting point of a welded section when the height variation detected by the detecting means at every predetermined pitch exceeds a predetermined threshold for the number of a predetermined times consecutively can prevent false detection of narrow foreign matters, such as a spatter. Height variation detection using laser light can detect the welded section even for welded section with a low height projection.

Advantageous Effects of Invention

The present invention can provide a post-heating treatment device that performs a post-heating treatment for a welded section of a rail, wherein the welded section of the rail can be automatically detected and a heat treatment can be performed at an appropriate position of the rail, and a post-heating treatment method.

DESCRIPTION OF EMBODIMENTS

Hereinafter, embodiments of a post-heating treatment device and a post-heating treatment method according to the present invention will be described with reference to the drawings. The post-heating treatment device and the post-heating treatment method according to the present invention are intended for automatically detecting a welded section of rails jointed by welding, and further performing the heat treatment, whereby tensile residual stress remaining in the welded section of the rail is removed.

Figure 1:
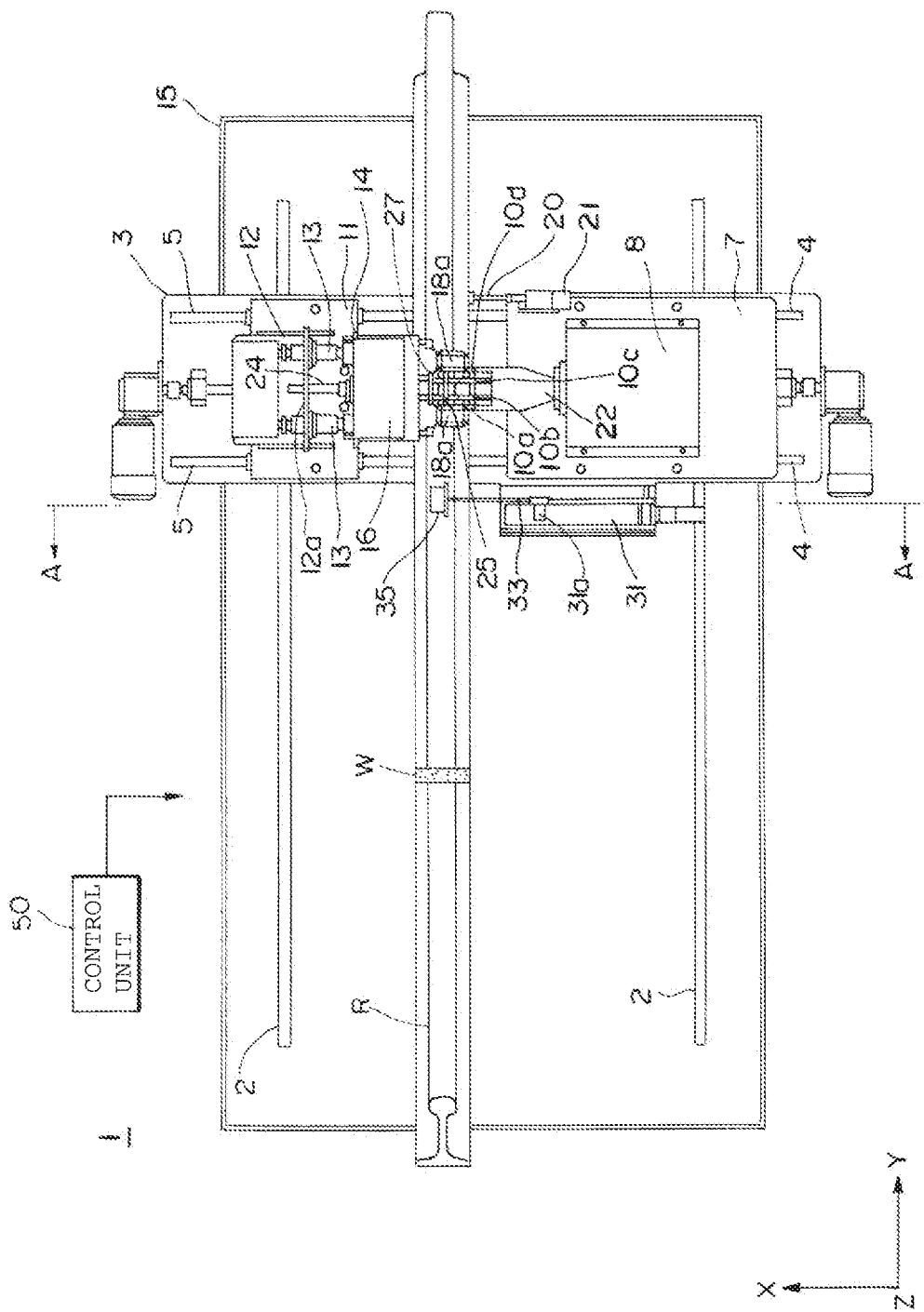
FIG. 1 is a plan view of a post-heating treatment device according to the present invention.
Figure 2:
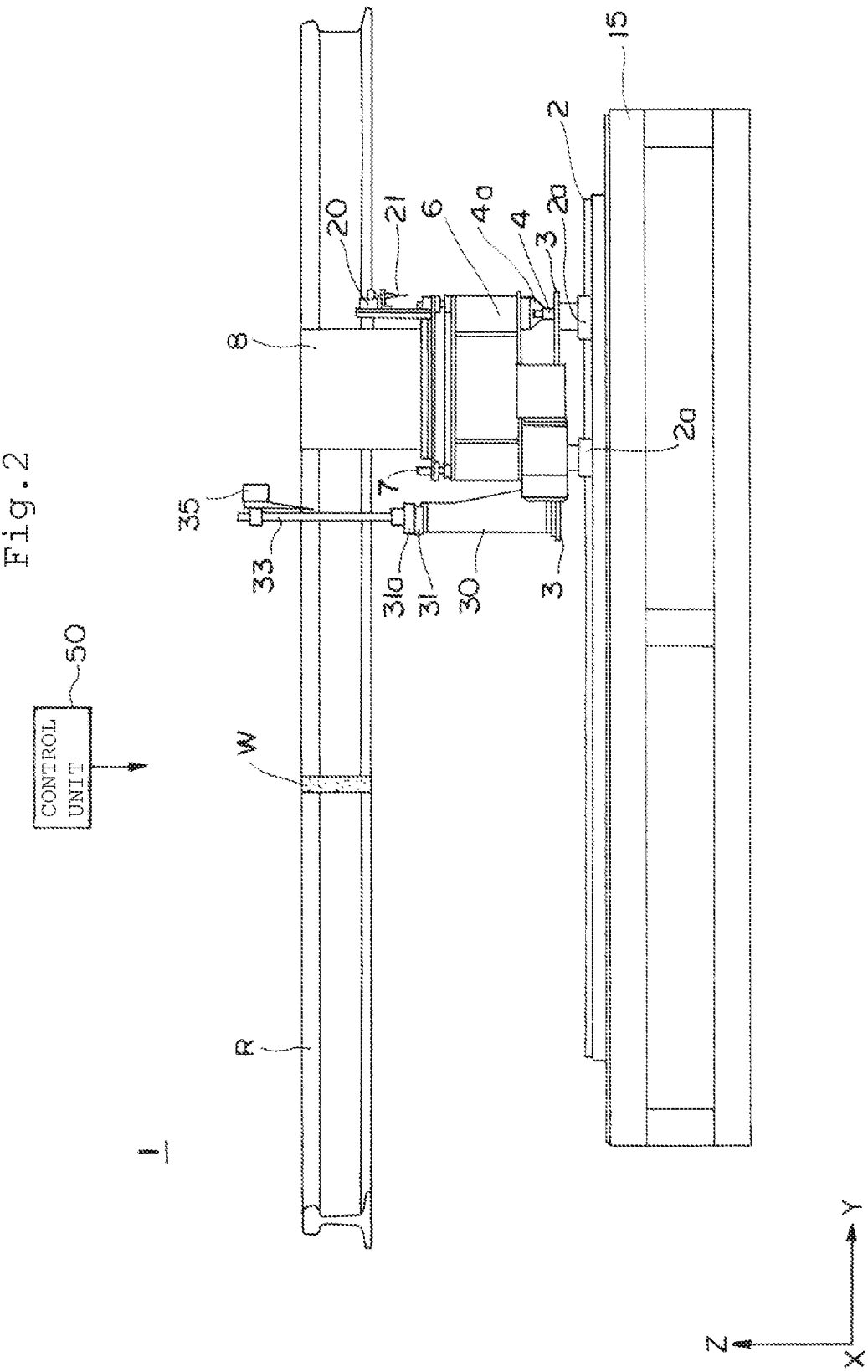
FIG. 2 is a side view of the post-heating treatment device in FIG. 1.
Figure 3:
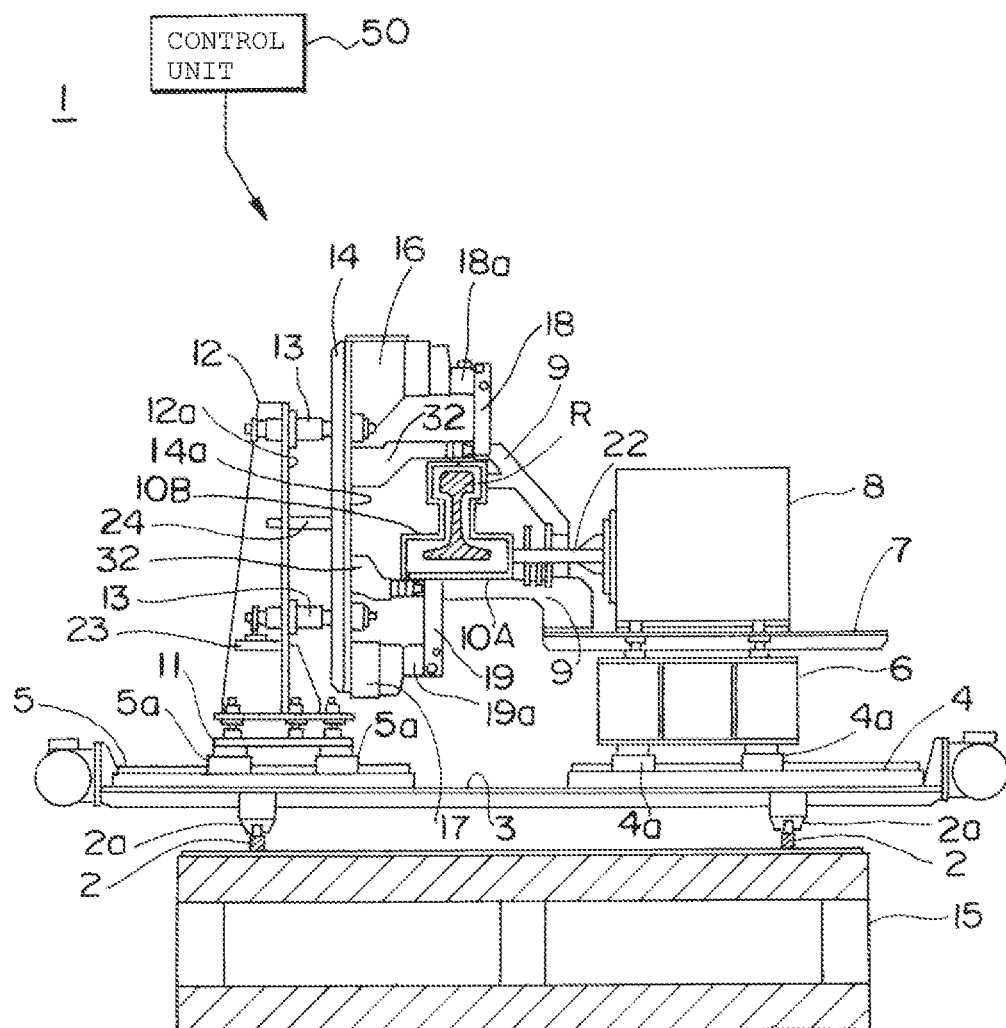
FIG. 3 is a cross-sectional view of the post-heating treatment device taken from line A-A of FIG. 1.

FIG. 1 is a plan view of a post-heating treatment device according to the present invention. FIG. 2 is a side view of the post-heating treatment device in FIG. 1, and FIG. 3 is a cross-sectional view of the post-heating treatment device taken from line A-A of FIG. 1. The illustrated post-heating treatment device 1 includes a first base 15 above which a rail R, an object to be heat-treated, jointed by welding is disposed, and a pair of guide rails 2 laid on the first base 15 parallel to the rail R which extends in the Y direction.

The post-heating treatment device 1 further includes a second base 3 supported by a slider 2a that is movable along the guide rail 2 and formed to be extending long in the X direction perpendicular to the guide rail 2. The second base 3 is adapted to be movable by the slider 2a in the Y direction that is a longitudinal direction of the guide rail 2.

Further, although not shown, for example, a ball screw and a stepping motor for rotating the ball screw around its axis are incorporated in the guide rail 2, and the slider 2a is configured to be moved by the rotation of the ball screw. The same configurations can be adopted for other guide rails and sliders moving therealong described in the following.

As shown in FIG. 3, on the second base 3, a pair of guide rails 4 that is a first guide rail as a first coil moving means, and a pair of guard rails 5 that is a second guide rail as a second coil moving means are respectively laid on both sides of the rail R in the X direction that is perpendicular to the rail R.

On the pair of guide rails 4, a box-shaped support base 6 is movably provided with a slider 4a, a first slider, interposed therebetween. In addition, a third base 7 is disposed on the support base 6, and a matching transformer 8, which is a high-frequency current transformer as a current applying means to be supplied with high-frequency electric current from a high-frequency inverter (not shown), is disposed on the third base 7.

A support plate 22, which is provided therein with a conductive wire connected to the output terminal of the matching transformer 8, is provided on one side surface facing to the rail R of the matching transformer 8. A first coil 10A is supported by the support plate 22 and a plurality of coil supports 9 serving as plate-shaped support members. The coil supports 9 are formed from a lightweight and high-strength material, such as fiber reinforced plastics (FRP).

Since the first coil 10A is supported on one side surface of the matching transformer 8 as mentioned above, the first coil is movable in the X direction along the guide rail 4 together with the matching transformer 8, and is also capable of advancing and retracting with respect to the rail R.

As shown in FIG. 3, the first coil 10A has one of the shapes obtained by dividing a similar shape in cross section to the rail R into two, asymmetric in the present embodiment. Consequently, the periphery on one side of the rail R can be covered by bringing the first coil 10A close to the rail R at a predetermined distance. The matching transformer 8 and the first coil 10A are electrically connected via the conductive wire provided in the support plate 22.

In addition, as shown in FIG. 1, a dog shaft 20 and a sensor 21, which are a first sensor and a first coil moving means, are provided on the third base 7 to detect an appropriate adjacent position, when the first coil 10A is approaching to the rail R.

The dog shaft 20 is provided to protrude toward the rail R side, and the sensor 21 is configured to be in detection operation on abutment of a head of the dog shaft 20 with the rail R; that is, the sensor 21 detects the slider 4a is located at a predetermined position on the guide rail 4. The position of the first coil 10A where the sensor 21 works is regarded as the appropriate position.

A rectangular plate-shaped fourth base 11 is horizontally disposed on the guide rail 5 with a slider 5a as a second slider interposed therebetween; the fourth base 11 is to be slidable in the X direction. As shown in FIG. 3, a bracket 12 as a first support member extending high in the vertical direction is provided on the fourth base 11, and as shown in FIGS. 1 and 3, a vertical face 12a of the bracket 12 is oriented to the rail R side.

Dog shafts 13 protruding toward the rail R side are attached to four sites, upper left and right, and lower left and right positions, of the vertical surface 12a. A clamp mounting plate 14 is supported at the distal ends of the four dog shafts 13, and is held with its one face 14a being opposed perpendicularly to the rail. The distance between the vertical face 12a of the bracket 12 and the clamp mounting plate 14 is properly set by the four dog shafts 13.

Hydraulic clamp devices 16 and 17 are respectively provided on an upper and lower part of the surface 14a facing to the rail R side of the clamp mounting plate 14. The hydraulic clamp devices 16 and 17 respectively have clamp arms 18 and 19, which are rotatable with link mechanisms 18a and 19a.

A plurality of coil supports 32 made of FRP, for example, is attached to a central part of the surface 14a of the clamp mounting plate 14, and the second coil 10B is supported by the coil supports 32. The second coil 10B is movable in the X direction along the guide rail 4, and capable of advancing and retracting with respect to the rail R.

The second coil 10B has a shape that is to form a shape similar to the cross section of the rail R when coupled with the first coil 10A. Both of the members, by coming to close to each other and into contact as shown in FIG. 3, can completely cover the circumference of the rail R with a predetermined interval kept.

A sensor 23 is attached to the bracket 12, and when the second coil 10B approaches the rail R and comes into contact with the first coil 10A, the sensor detects the abutment. The position of the second coil 10B when the sensor 23 operates is recognized to be the proper position.

Further, a spring 24 is provided between the bracket 12 and the clamp mounting plate 14, and this absorbs the shock when the second coil 10B comes into contact with the first coil 10A.

As shown in FIGS. 1 and 2, a guide rail 31 extending in the X direction is additionally provided on the first base 3 with a bracket 30 interposed therebetween, and an arm 33 that holds a laser displacement meter 35 (height variation detecting means) is provided on a slider 31a that slides along the guide rail 31. The laser light emitted from the laser displacement meter 35 is directed vertically downward, and the height variation can be measured by receiving the reflected light.

In this configuration, the laser displacement meter 35 is made movable in the Y direction by the guide rail 2, and movable in the X direction by the guide rail 31. Therefore, the laser displacement meter 35 can see, across the rail R, the variation of the surface height of the rail R at any position in the length direction of the rail R.

Figure 4:
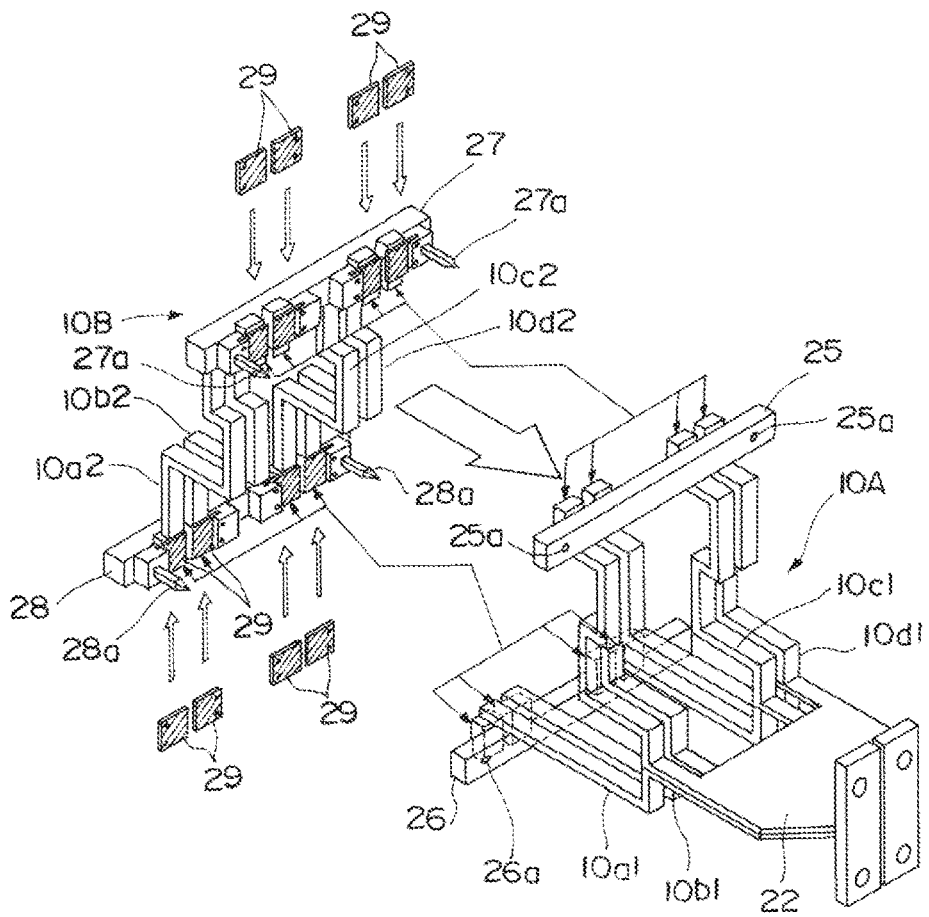
FIG. 4 is a perspective view of a first coil and a second coil separated.

Subsequently, the configurations of the first coil 10A and second coil 10B will be described in more detail with reference to FIGS. 4 and 5. FIG. 4 is a perspective view of the first coil 10A and second coil 10B in a separated state, and FIG. 5 is a perspective view of the first coil 10A and second coil 10B contacted.

Figure 5:
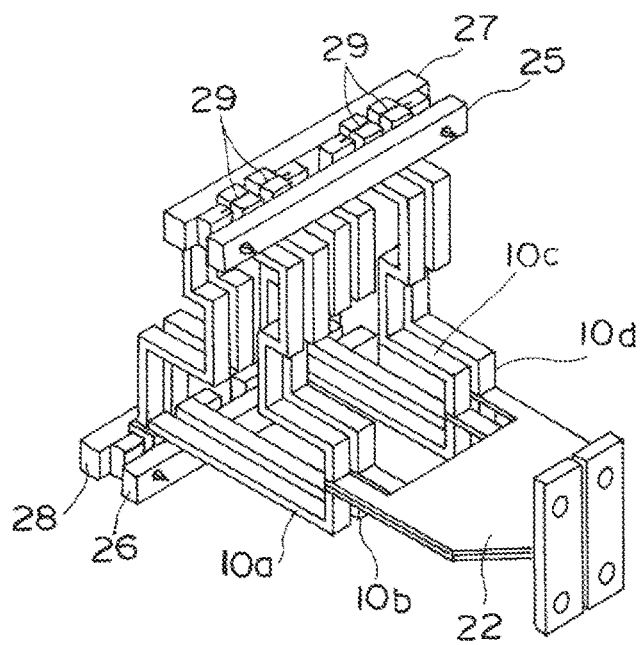
FIG. 5 is a perspective view of the first coil and second coil contacted.

As shown in FIGS. 4 and 5, each of the first coil 10A and the second coil 10B has a set of coils $10a1$, $10b1$, $10c1$, $10d1$ and a set of $10a2$, $10b2$, $10c2$, $10d2$, respectively, all of which are dividedly made of copper tubes, such that they are configured to form four one-turn induction heating coils 10a, 10b, 10c, 10d (heating means), when coupled.

In the first coil 10A, upper ends of the set of coils $10a1$, $10b1$, $10c1$, $10d1$ are fixed to a single square bar stay 25 for holding the upper ends aligned, and lower ends are fixed to a single square bar stay 26 for holding the lower ends aligned. In addition, at the both ends of the stay 25 and the stay 26 through holes 25a and 26a are formed respectively.

Meanwhile, In the second coil 10B, upper ends of the set of coils $10a2$, $10b2$, $10c2$, $10d2$ are fixed to a single square bar stay 27 to hold the upper ends in alignment, and lower ends thereof are fixed to a single square bar stay 28 to hold the lower ends in alignment. In addition, at the both ends of the stay 27 and the stay 28 positioning pins 27a and 28a are provided respectively.

As shown in FIG. 5, the upper ends of the set of coils $10a1$, $10b1$, $10c1$, $10d1$ of the first coil 10A come into contact with the upper ends of the set of coils $10a2$, $10b2$, $10c2$, $10d2$ of the second coil 10B, respectively. The lower ends of the set of coils $10a1$, $10b1$, $10c1$, $10d1$ of the first coil 10A come into contact with the lower ends of the set of coils $10a2$, $10b2$, $10c2$, $10d2$ of the second coil 10B, respectively.

In this case, the positioning pins 27a at the both ends of the stay 27 are inserted into the through holes 25a at the both ends of the stay 25, and the positioning pins 28a at the both ends of the stay 28 are inserted into the through holes 26a at the both ends of the stay 26. Thus, this structure enables to prevent displacement of contact portions of the four induction heating coils 10a, 10b, 10c, and 10d.

In addition, with the positioning pins 27a, 28a inserted in the through holes 25a, 26a, the hydraulic clamp devices 16, 17 operate so that the clamp arm 18 presses the stay 25 against the stay 27, whereas the clamp arm 19 presses the stay 26 against the stay 28, whereby the contact portions are clamped.

In addition, the contact portions between the first coil 10A and the second coil 10B are provided with plate members 29 made of silver (herein after silver plate member) in order to ensure electrical connection. The silver plate members 29 are desirably provided in a replaceable manner for maintainability improvement.

The first coil 10A and the second coil 10B thus coupled form the four induction heating coils 10a, 10b, 10c, 10d as described above. The supply of a high-frequency current to the coils causes to heat the entire circumference at a predetermined position of the rail R.

In the use of these induction heating coils 10a, 10b, 10c, 10d, two of them are to be arranged on each side across the welding center of the rail R with a predetermined separation from the welding center in the length direction.

The post-heating treatment device 1 includes a control unit 50 (control means) including a computer that detects the position of a rail welded section W based on the detection result of the laser displacement meter 35 and controls the whole operation.

The control unit 50 that has an operation panel including a touch panel having an information display function that can be operated by an operator, allows settings for input of the threshold value of a bead height that is to be used for detection of the welded section W.

Subsequently, the operation of the post-heating treatment device according to the present invention will be described with reference to the state transition diagrams of FIGS. 7A to 7C and FIGS. 9A to 9D, on the basis of the flow chart of FIG. 6.

Figure 6:
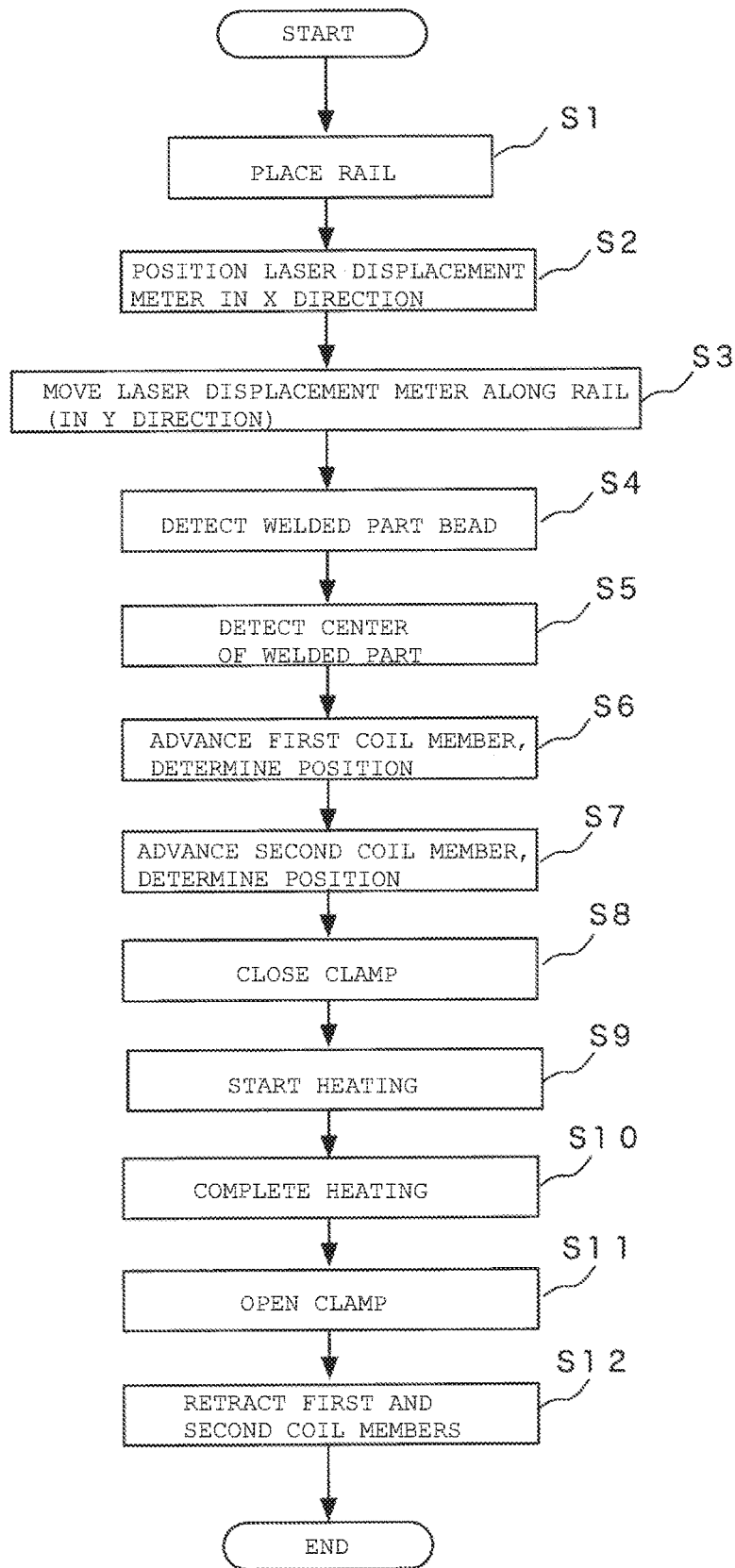
FIG. 6 is a flowchart showing a series of operations with the post-heating treatment device according to the present invention.

First, when the rail R to be subjected to a post-heating treatment is disposed on the post-heating treatment device 1, the control unit 50 detects disposition of the rail R with a sensor (not shown) (step S1 in FIG. 6).

Figure 7A:
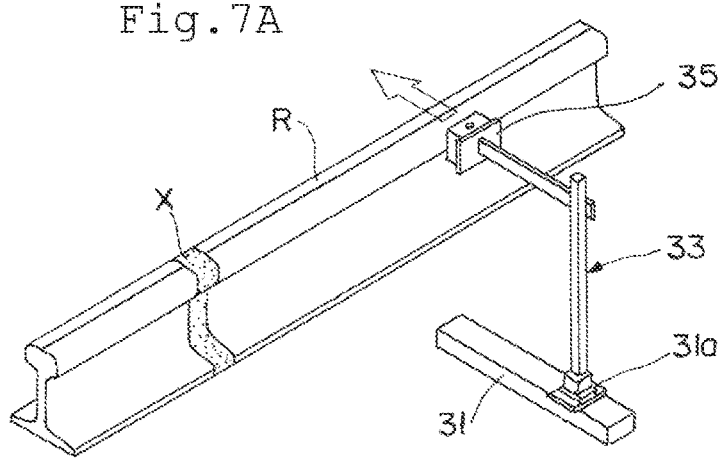
FIGS. 7A to 7C are state transition diagrams illustrating the operation of a laser displacement meter for detecting a welded section.

Next, in order to detect the welded section W of the rail R, the control unit 50 controls the slider 31a to move on the guide rail 31 toward the rail R (in the X direction) as shown in FIG. 7A, and stops the slider 31a at the position where the laser light from the laser displacement meter 35 hits the head surface of the rail R, for example, (step S2 in FIG. 6). According to the present embodiment, the head surface of the rail R is intended to be irradiated with the laser, but any position may be irradiated except the bottom surface of the rail.

Figure 7B:
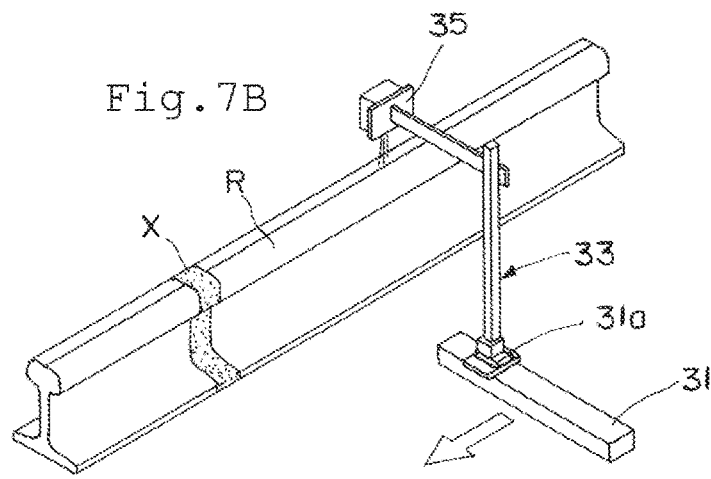

When the position of the laser displacement meter 35 in the X direction is determined, the control unit 50 moves the slider 2a at a predetermined speed along the guide rail 2. Namely, as shown in FIG. 7B, the laser displacement meter 35 is controlled to move along the rail R with the laser light being irradiated to the head surface of the rail R (step S3 in FIG. 6).

Figure 8:
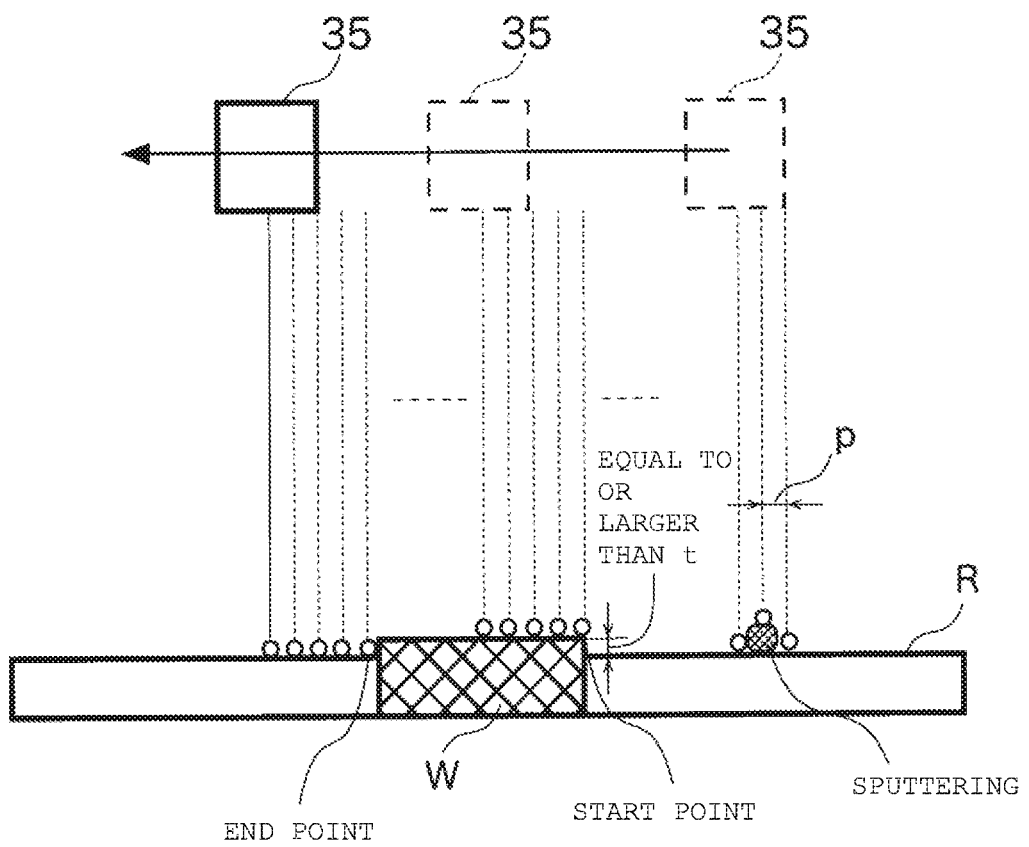
FIG. 8 is a side view schematically illustrating a laser displacement meter and rails for explaining the operation of detecting a start point and an end point of a welded section.

Suppose that the feed pitch of the laser displacement meter 35 is denoted by p, the bead height threshold of the welded section W is denoted by t, and the bead width threshold is denoted by 5p. As schematically shown in FIG. 8, when five successive variations larger than the bead height threshold t (for the length of 5p) are detected the control unit 50 defines the measurement point before the five variations as a start point of the welded section W (step S4 in FIG. 6).

Figure 7C:
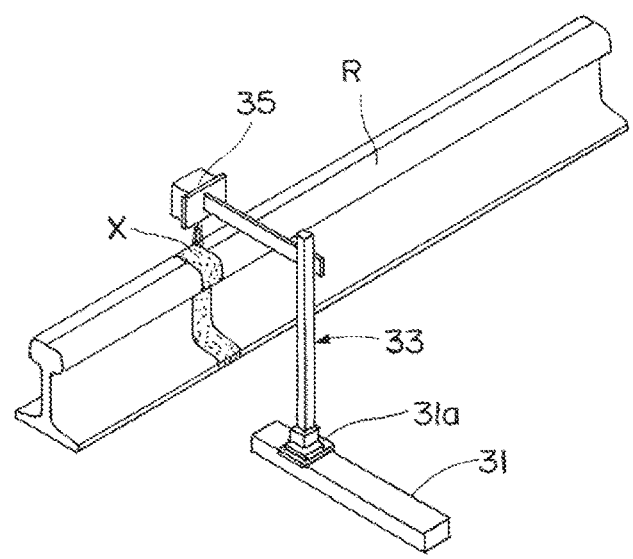

Thereafter, when five successive variations smaller than the bead height threshold t (for the length of 5p) are detected, the control unit defines the measurement point before the five variations as an end of the welded section W. As shown in FIG. 7C, the center between the start point and the end point is recognized as the center of the welded section; the positioning in the rail length direction is achieved (step S5 in FIG. 6).

Such a detection method using laser light can also be applicable to welded sections with lower heights, even if a height of a lower welded section is less than a typical bead height of 1 mm, by lowering the bead height threshold t down to on the order of 0.5 mm. This method allows preventing erroneous detection of foreign objects small in width such as a welding spatter shown in FIG. 8 because recognition of the welded section W is achieved when successive variations larger than the bead height threshold t for the length of 5p occur.

Figure 9A:
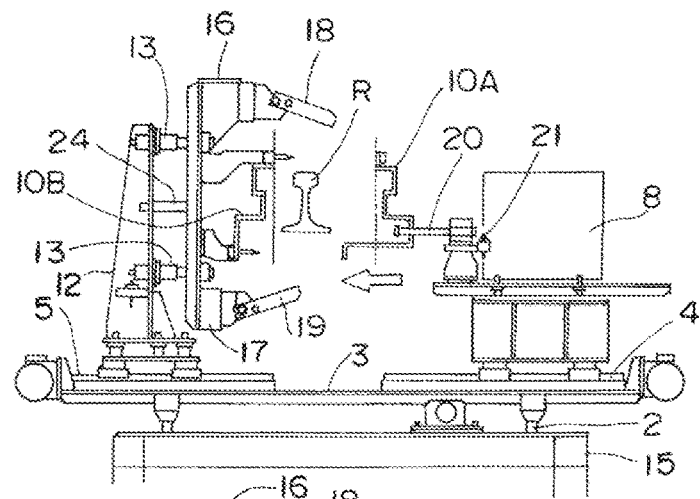
FIGS. 9A to 9D are state transition diagrams for explaining a clamping operation for the first coil and the second coil for surrounding the periphery of the rail.

When the center position of the welded section W in the rail length direction is determined, the control unit 50 firstly starts the first coil 10A moving to the rail from the state shown in FIG. 9A.

Figure 9B:
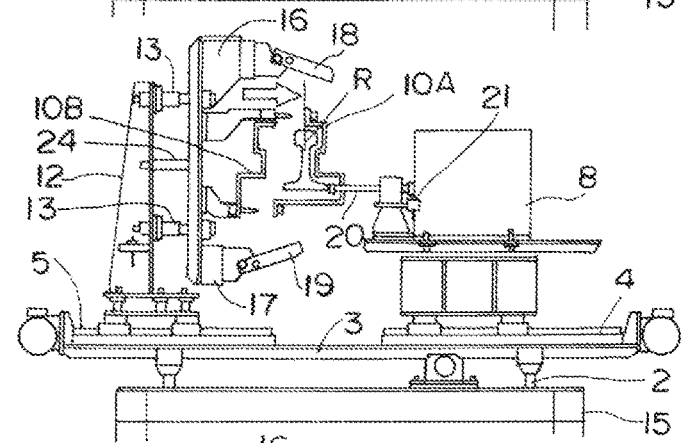

As shown in FIG. 9B, when the dog shaft 20 come into contact with the rail R, the sensor 21 operates to stop the movement of the first coil 10A in the X direction (step S6 in FIG. 6).

The control unit 50 consequently starts the second coil 10B moving toward the rail R (along the X axis). When the second coil 10B come into contact with the first coil 10A, and the positioning pin 27a of the stay 27 and the positioning pin 28a of the stay 28 are inserted into the through hole 25a of the stay 25 and the through hole 26a of the stay 26, respectively, the sensor 23 operates to stop the movement of the second coil 10B (step S7 in FIG. 6).

Figure 9C:
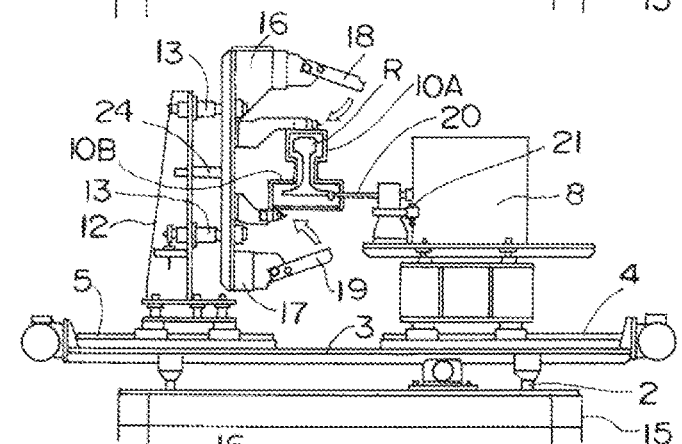
Figure 9D:
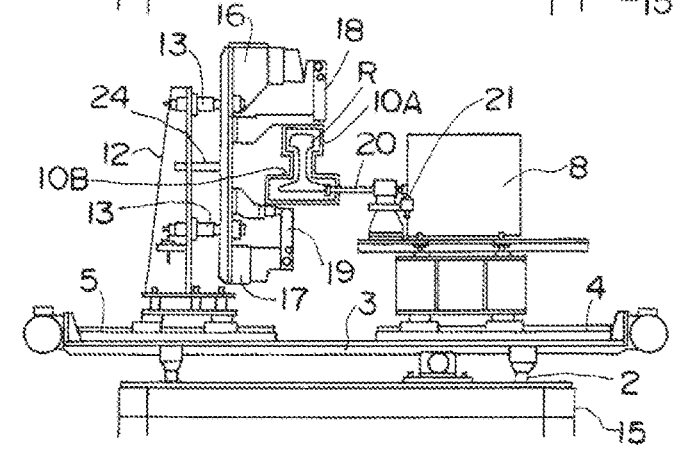
Figure 10:
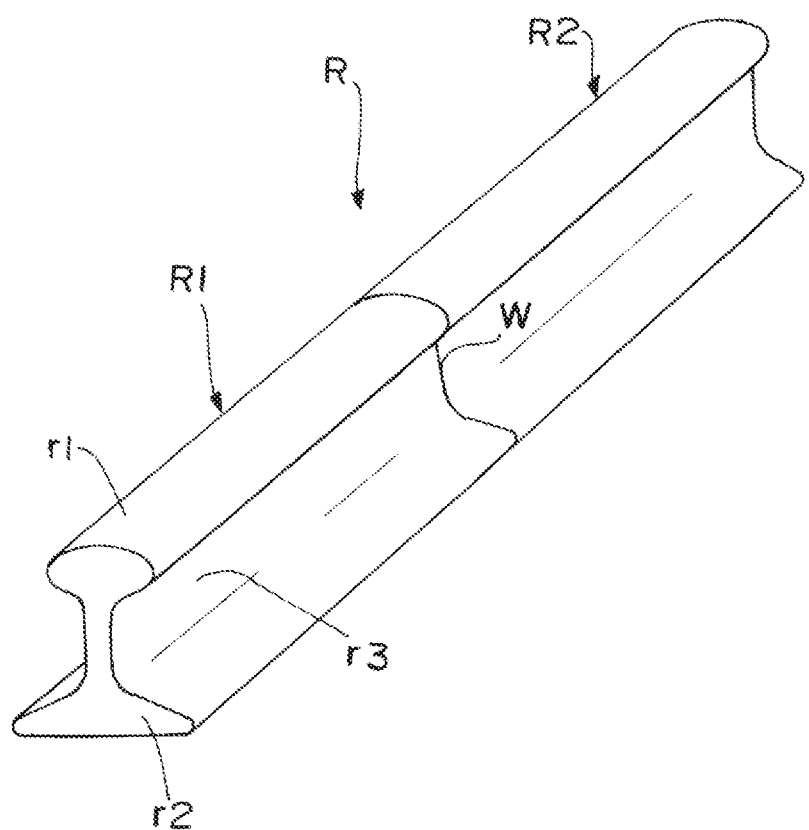
FIG. 10 is a perspective view of rails jointed by welding.

Next, as shown in FIG. 9C, the hydraulic clamp device 16 operates to rotate the clamp arm 18 with the link mechanism 18a, and to press the stay 25 with the through holes 25a against the stay 27 with the arm tip, that is, to clamp the contact portion. As a result, as shown in FIG. 9D, the first coil 10A and the second coil 10B are firmly coupled to each other; formed are the induction heating coils 10a, 10b, 10c, 10d that cover the entire circumference at a predetermined position of the rail R (Step S8 in FIG. 6).

At this time, the induction heating coils 10a, 10b, 10c, 10d are to be arranged by two on each side across the center of the welded section W of the rail R at a predetermined distance (for example, 20 mm or more and 300 mm or less) from the welding center in the length direction. With this configuration, the residual stress present in the welded section can be effectively reduced by heating at a high heating rate using the electromagnetic induction coils from a position away from the welding center at a predetermined distance. In addition, the induction heating coils 10a, 10b, 10c, 10d heat the entire circumference of the rail R; it is possible to prevent an increase of residual stress in the length direction of the rail R.

Subsequently, a high-frequency current is supplied from the high-frequency inverter (not shown) to a matching transformer 8, and a current transformed with the matching transformer 8 is supplied to the induction heating coils 10a, 10b, 10c, and 10d. Thus, a predetermined site of the rail R is inductively heated (step S9 in FIG. 6).

Upon completion of the heat treatment (step S10 in FIG. 6), the control unit 50 drives the hydraulic clamp devices 16 and 17 to rotate the clamp arms 18, 19 to release the clamp (step S11 in FIG. 6).

Then, each of the first coil 10A and the second coil 10B is retracted to separate, and the operation is completed (step S12 in FIG. 6).

As described in the embodiment according to the present invention, a laser displacement meter irradiates laser light to detect height variation along the length direction of the rail R to a welded section W of the rail R which is made to be a continuous welded rail by welding. A position of the rail is judged to be a starting point of the welded section W when the height variation detected by the laser displacement meter at every predetermined pitch exceeds a predetermined threshold value for the number of a predetermined times, 5 times for example, consecutively, and a position of the rail is judged to be an end point of the welded section W when the height variation detected by the laser displacement meter at every predetermined pitch is below a predetermined threshold value for the number of a predetermined times, 5 times for example, consecutively.

This enables to detects the center of the welded section W and determine an appropriate position for disposing the induction heating coils.

A rail having a stable quality after post-heating can be obtainable because detection of a proper position of the welded section W and heat treatment of the welded section W are automatically performed Since a starting point of the welded section W is determined when the height variation detected by the laser displacement meter at every predetermined pitch exceeds a predetermined threshold value for the number of a predetermined times, 5 times for example, consecutively, erroneous detection of a foreign matter with a narrow width such as a spatter is prevented and a welded section W with low height can be highly accurately detected because of height variation detection using a laser displacement meter.

In the embodiment, an example is given where a welded section W of two rails jointed is detected and subjected to the post-heating treatment. The present invention is not limited to the example, but can be also applied to a case in which multiple welded sections of multiple rails jointed are continuously detected, and subjected to the post-heating treatment.

In addition, while the laser displacement meter 35 is used as displacement detecting means in the present embodiment, the displacement detecting means is not limited to the displacement detection using laser light, but displacement detection can be also achieved with other elements such as ultrasonic waves.

In addition, while the positioning pins 27a, 28a formed on the stays 27, 28 are inserted into the through holes 25a, 26a formed in the stays 25, 26 in the embodiment mentioned above. The present invention is not limited to the above configuration, but positioning pins may be formed on the stays 25, 26, whereas through holes may be formed in the stays 27, 28.

REFERENCE SIGNS LIST

1 Post-heating treatment device
2 Guide rail
2a Slider
3 Second base
4 Guide rail (first guide rail)
5 Guide rail (second guide rail)
6 Support base
7 Third base
8 Matching transformer (current applying means)
9 Coil support
10A First coil
10B Second coil
10a Induction heating coil
10b Induction heating coil
10c Induction heating coil
10d Induction heating coil
11 Fourth base
12 Bracket (first support member)
13 Dog shaft
14 Clamp mounting plate (second support member)
15 First base
16 Hydraulic clamp device (rotation drive means, clamping means)
17 Hydraulic clamp device (rotation drive means, clamping means)
18 Clamp arm
18a Link mechanism
19 Clamp arm
19a Link mechanism
20 Dog shaft
21 Sensor (first sensor)
22 Support plate
23 Sensor (second sensor)
24 Spring (elastic member)
25 Stay
25a Through hole
26 Stay
26a Positioning pin
27 Stay
27a Through hole
28 Stay
28a Positioning pin
29 Silver plate member
30 Bracket
31 Guide rail
31a Slider
32 Coil support
33 Arm
35 Laser displacement meter (welded section detecting means)
50 Control unit
R Rail
W Welded section

What is claimed is:

1. A post-heating treatment device that performs post-heating treatment for a welded section of a welded rail, the post-heating treatment device comprising:

a detecting means for moving along a length direction of the rail and for consecutively detecting height variations of a surface of the rail at measurement points separated from each other by a predetermined pitch along the length direction of the rail;

a control unit for determining a starting point of the welded section when the height variations detected by the detecting means across the measurement points exceed a predetermined threshold value for a predetermined number of times consecutively, and as an end point of the welded section when the height variations detected by the detecting means across the measurement points are below the predetermined threshold value for the predetermined number of times consecutively, and defining the welded section as being between the starting point and the end point; and a heating means for the post-heat treatment of the rail at a position of the welded section determined by the control unit.

2. The post-heating treatment device according to claim 1, wherein the detecting means irradiates laser light to the surface of the rail, and detects the height variations by receiving reflected light.

3. The post-heating treatment device according to claim 1, wherein the control unit determines, as the starting point of the welded section, a measurement point where a height variation firstly exceeding the predetermined threshold value is detected when the height variations detected by the detecting means exceed the predetermined threshold value for the predetermined number of times consecutively, and as the end point of the welded section, another measurement point where another height variation firstly being below the predetermine threshold value is detected when the height variations detected by the detecting means are below the predetermined threshold value for the predetermined number of times consecutively.

4. The post-heating treatment device according to claim 3, further comprising
   a first base arranged under the rail and including a first guide rail extending in the length direction of the rail, and
   a second base moving on the first base along the first guide rail and including a second guide rail extending in a direction perpendicular to the first guide rail,
   wherein the detecting means is arranged on the second base, and moves with the second base integrally in the length direction of the rail along the first guide rail and moves on the second base in the direction perpendicular to the length direction of the rail along the second guide rail.

5. The post-heating treatment device according to claim 4, further comprising
   a third base arranged on the second base,
   a matching transformer arranged on the third base,
   a first coil connected to the matching transformer and including first induction heating coils,
   a fourth base arranged on the second base and facing to the third base,
   a clamp mounting plate arranged on the fourth base, and
   a second coil connected to the clamp mounting plate and including second induction heating coils,
   wherein the second base further includes a third guide rail and a fourth guide rail, extending in the direction perpendicular to the first guide rail,
   the third base moves on the second base along the third guide rail and the fourth base moves on the second base along the fourth guide rail to engage the first coil and the second coil, and
   the first induction heating coils and the second heating coils heat a circumference of the welded section, as the heating means.

* * * * *